United States Patent Office 3,298,970
Patented Jan. 17, 1967

3,298,970
EXPANDED COATINGS
Donald E. Stare, Donald R. Strack, and Harold J. Reindl, all of Dayton, Ohio, assignors to General Motors Corporation, Detroit, Mich., a corporation of Delaware
No Drawing. Filed Dec. 18, 1961, Ser. No. 160,275
3 Claims. (Cl. 260—2.5)

This invention relates to elastomeric coatings and is particularly directed to spongy coatings.

Cement type coatings have frequently been used in gasketing and the like. These coatings, due to the fact that they are applied in the fluid condition, have been extremely thin and could only be used where machined surfaces were to be joined. The present coating may also be used for gasketing and the like and has the advantage over standard coatings in that a closed cell sponge is formed in situ within the coating after application thereof. The spongy character of the coatings expands the thickness thereof to form 1 to 3 times the applied thickness whereby a useful gasket is formed.

The same type of material may also be used with a high degree of success as a filler material wherein the coating may be brushed, sprayed, or otherwise spread onto the surface and wherein the coating is sufficiently fluid to fill in cracks and crevices upon blowing to form a fluid tight seal whereby a continuous surface covering is produced which eliminates cracks and the like. One use of this material is as an under body coating material for automotive vehicles and the like.

It is therefore the object of this invention to provide a fluid or flowable coating compound which may be applied by any of the usual procedures wherein the compound, after application and during curing, will form a high resiliency, low density, closed cell sponge.

In carrying out the above object it is a further object to utilize basic compounds of either natural rubber or butadiene styrene copolymer rubber.

In carrying out this object it is a further object to provide a compound comprising a major portion of a base polymer such as butadiene styrene copolymer rubber or natural rubber which is suitably compounded with a filler, an accelerator and a vulcanizing agent together with a blowing agent. This material is diluted or cut to the desired viscosity by means of a solvent and is ready for application.

In carrying out the above object it is obvious that after application the compound is cured and during this cure the blowing agent decomposes to form a gas which blows the material during its vulcanization whereby a closed cell rubbery layer is formed.

It is understood that where a strong bond is desired between the gasketing material of the present invention and any metal surface to which it is applied that it is desirable to utilize a tie cement layer to condition the metal for high adhesion. Tie cements are well known in the art and are generally chlorinated rubber type adhesives which adhere well to the surface of metal. The tie bond is applied in a very thin layer, for example, .001 to .002 of an inch, and is dried and acts as a primer whereupon the gasketing material is applied directly thereto.

In this connection, the blowing compound is brushed, sprayed, dipped, spread or roller coated onto the surface of the metal in an uncured film thickness in the order of .008 to .040 of an inch. This layer is air dried or it may be dried under accelerated conditions up to 150° F. in an oven to eliminate the solvent. Thereafter the part with the layer thereon is heated to a temperature in the order of 220° F.±5° for a time sufficient to cure the compound and secure the necessary blow. Preferably, and in accordance with the recipes to follow, the applied layer expands from 1–1 to 3–1 its original thickness according to the quantity of blowing agent utilized.

It is understood that the blowing material may be applied to other surfaces such as cardboard, wood and the like, and in these instances adhesion is good and no tie cement need be used under any circumstances, although the use of such cement even in the case of metal is optional according to the desired end result.

One compound for a satisfactory cement includes butadiene styrene copolymer master batch 189 parts together with about 20 parts of a softener comprising a high molecular weight hydrocarbon oil preferably with aromaticity in the chain. Powdered limestone in quantities up to 30 parts by weight may be used if desired as a filler. A light process oil in quantities of about 10 parts by weight is useful in the recipe as a softener together with 1.75 parts of zinc dimethyldithiocarbamate as an accelerator, 2 parts sulfur as a vulcanizing agent and 5 parts of dinitrosopentamethylene tetramine as a blowing agent. All of these materials are mixed on a mill and xylol is added until the desired viscosity is obtained. In this connection, viscosities ranging from a watery liquid to a thick dough are useful, depending upon the desired thickness of the final film and the method of application and use thereof.

The master batch referred to above is preferably made of up three different grades of rubbery butadiene styrene copolymer where at least one of the grades is an oil extended material. While this is preferred, a single GRS rubber may be used if desired. In any event the GRS component of the master batch makes up 100 parts by weight. The accelerator in the master may be selected from 2,2'-methylene-bis (4 methyl-6-tert butylphenol) or nickel dibutyldithiocarbamate and the quantity of accelerator amounts to about 4 parts by weight. If desired, this accelerator may comprise both of the materials noted above or any other suitable accelerator for butadiene styrene materials. 60 parts of a carbon black are added as a filler and reinforcing aid together with 5 parts of zinc oxide and 2 parts of magnesium oxide as a vulcanizing agent. Other materials may be added, for example, 5 parts of a microcrystalline wax as a softening aid and 5 parts of petroleum amber as a processing aid. All of these ingredients in the master batch are thoroughly mixed on a Banbury and are then used in a recipe set forth.

It is understood that substantial variations in formulation in ingredients may be used without departing from the spirit of this invention. Another useful formulation is as follows.

| Ingredient | Parts by weight |
|---|---|
| GRS | 40.70 |
| Carbon black | 33.10 |
| Whiting (40 micron) | 11.95 |
| Aromatic oil | 9.19 |
| Magnesium oxide | .86 |
| Zinc oxide | 2.00 |
| Tetramethyl thiuram disulfide | .70 |
| Sulfur | .80 |
| Diethyl thiourea | .30 |
| Dinitroso pentamethylene tetramine | .40 |
| | 100.00 |

In place of dinitroso pentamethylene tetramine, benzene sulfanyl hydrazide may be used as a blowing agent. The above ingredients are mixed on a mill and are then placed in a churn with naptha in quantities sufficient to form a 20% by weight solids solution. Of course, if other viscosities are desired they may be varied to obtain the desired results.

It is understood that variations in weight of ingredients may occur for specific purposes in the aforementioned recipe. The following ranges may be used without departing materially from the scope of my invention.

| Ingredient: | Parts by weight |
|---|---|
| GRS | 30–50 |
| Carbon black | 20–40 |
| Whiting (40 micron) | 5–20 |
| Aromatic oil | 5–20 |
| Magnesium oxide | 0–5 |
| Zinc oxide | 0–10 |
| Tetramethyl thiuram disulfide | .1–2.0 |
| Sulfur | .2–4.0 |
| Diethyl thiourea | .1–1.0 |
| Dinitroso pentamethylene tetramine | .1–1.0 |

The mill mix is dissolved as before in an organic solvent to the desired consistency and is then ready for use.

In place of butadiene styrene rubber, natural rubber may be used in like quantities and may be substituted in any of the formulations in whole or in part for the GRS.

While the embodiments of the present invention as herein disclosed, constitute preferred forms, it is to be understood that other forms might be adopted.

What is claimed is as follows:

1. A flowable, permanent sealing cement for applications to surfaces to be sealed comprising in combination; a fluid compound having as a base an uncured rubbery material taken from the class consisting of butadiene styrene copolymer rubber, natural rubber and mixtures thereof together with accelerator, softeners, fillers and vulcanizing agents and a blowing agent, said compound being dissolved in an organic solvent capable of being evaporated after application of the compound to a surface whereby the compound upon heating will blow and vulcanize concurrently so that the final thickness of the layer applied is in the order of from 2 to 3 times the original thickness thereof and comprises a spongy closed cell cured, rubbery structure.

2. A flowable, permanent sealing cement for applications to surfaces to be sealed comprising in combination; a fluid compound having as a base a compound of an uncured rubbery material taken from the class consisting of butadiene styrene copolymer rubber, natural rubber and mixtures thereof together with suitable compounding ingredients including a vulcanizing agent and a blowing agent taken from the class consisting of dinitroso pentamethylene tetramine and benzene sulfanyl hydrazide, said compound being dissolved in an organic solvent capable of being evaporated after application of the compound to a surface whereby the compound upon heating will blow and vulcanize concurrently so that the final thickness of the layer applied is in the order of from 2 to 3 times the original thickness thereof and comprises a spongy closed cell cured, rubbery structure.

3. A flowable, permanent sealing cement for applications to surfaces to be sealed comprising in combination; a fluid compound having as a base a compound of an uncured rubbery material taken from the class consisting of butadiene styrene copolymer rubber, natural rubber and mixtures thereof together with suitable compounding ingredients including a vulcanizing agent and dinitroso pentamethylene tetramine as a blowing agent in quantities of from .1 to 1% by weight of the compound, said compound being dissolved in an organic solvent capable of being evaporated after application of the compound to a surface whereby the compound upon heating will blow and vulcanize concurrently so that the final thickness of the layer applied is in the order of from 2 to 3 times the original thickness thereof and comprises a spongy closed cell cured, rubbery structure.

References Cited by the Examiner
UNITED STATES PATENTS

| 2,209,451 | 7/1940 | Geyer | 260—2.5 |
| 2,544,483 | 3/1951 | Baum | 260—2.5 |
| 2,650,206 | 8/1953 | Stock | 260—2.5 |
| 2,763,897 | 9/1956 | Gates | 260—2.5 |
| 2,804,398 | 4/1957 | Hooks | 260—2.5 |
| 2,981,361 | 4/1961 | Schofield | 260—2.5 |

MURRAY TILLMAN, *Primary Examiner.*

LEON J. BERCOVITZ, *Examiner.*

M. FOELAK, *Assistant Examiner.*